US012531014B2

(12) United States Patent
Zen et al.

(10) Patent No.: US 12,531,014 B2
(45) Date of Patent: Jan. 20, 2026

(54) SIGNAL PROCESSING DEVICE, SIGNAL PROCESSING METHOD, AND DISPLAY DEVICE

(71) Applicant: SATURN LICENSING LLC, New York, NY (US)

(72) Inventors: Masao Zen, Chiba (JP); Syunsuke Kikuchi, Aichi (JP); Daisuke Miki, Tokyo (JP); Yasushi Konuma, Kanagawa (JP); Kazutaka Kobayashi, Kanagawa (JP); Kazuhiro Nukiyama, Kanagawa (JP); Kazuki Uchida, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 17/919,068

(22) PCT Filed: Apr. 19, 2021

(86) PCT No.: PCT/JP2021/015795

§ 371 (c)(1), (2) Date: Oct. 14, 2022

(87) PCT Pub. No.: WO2021/220853

PCT Pub. Date: Nov. 4, 2021

(65) Prior Publication Data

US 2023/0162668 A1 May 25, 2023

(30) Foreign Application Priority Data

May 1, 2020 (JP) ................................ 2020-081150

(51) Int. Cl.

*G09G 3/32* (2016.01)
*G09G 3/3208* (2016.01)

(52) U.S. Cl.

CPC ....... *G09G 3/3208* (2013.01); *G09G 2310/08* (2013.01); *G09G 2320/041* (2013.01);

(Continued)

(58) Field of Classification Search

CPC ............. G09G 3/3208; G09G 2310/08; G09G 2320/041; G09G 2320/0626; G09G 2320/103; G09G 2360/16

See application file for complete search history.

(56) References Cited

U.S. PATENT DOCUMENTS

| | | | |
|---|---|---|---|
| 5,805,131 | A | 9/1998 | Hartmann et al. |
| 2008/0231624 | A1 | 9/2008 | Poon |

(Continued)

FOREIGN PATENT DOCUMENTS

| | | |
|---|---|---|
| CN | 101609629 | 12/2009 |
| CN | 107256688 | 10/2017 |

(Continued)

OTHER PUBLICATIONS

English Translation of JP 2019101240 (Year: 2019).*

(Continued)

*Primary Examiner* — Patrick N Edouard
*Assistant Examiner* — Eboni N Giles
(74) *Attorney, Agent, or Firm* — Richard LaPeruta

(57) ABSTRACT

Provided is a signal processing device including a signal processing unit that, when increasing the luminance of an video signal from a low-luminance display signal to a high-luminance display signal, acquires information regarding at least one of luminance enhancement time obtained by measuring the time for enhancing the luminance on a display panel, the temperature rise amount of the display panel, and the feature amount of the video signal corresponding to video displayed on the display panel, and adaptively controls a first gain for enhancing the luminance of the video (Continued)

signal, according to the degree of influence on the temperature rise of the display panel, in reference to the acquired information. The present technique can be applied to a self-luminous display device, for example.

20 Claims, 15 Drawing Sheets

(52) U.S. Cl.
CPC ............... *G09G 2320/0626* (2013.01); *G09G 2320/103* (2013.01); *G09G 2360/16* (2013.01)

(56) References Cited

U.S. PATENT DOCUMENTS

| | | | | |
|---|---|---|---|---|
| 2015/0130856 A1* | 5/2015 | Funatsu | G09G 5/10 | 345/77 |
| 2015/0187277 A1* | 7/2015 | Maeyama | G09G 3/3225 | 345/694 |
| 2017/0124959 A1 | 5/2017 | Kim | | |
| 2017/0162098 A1 | 6/2017 | Cheon et al. | | |
| 2018/0144690 A1* | 5/2018 | Inokawa | G09G 3/32 | |
| 2018/0366061 A1* | 12/2018 | Furukawa | G09G 3/20 | |

FOREIGN PATENT DOCUMENTS

| | | |
|---|---|---|
| CN | 107610676 | 1/2018 |
| JP | H07152015 | 6/1995 |
| JP | 2003316320 A | 11/2003 |
| JP | 2015094795 A | 5/2015 |
| JP | 2015125356 A | 7/2015 |
| KR | 20110096930 | 8/2011 |
| KR | 20150077285 A | 7/2015 |
| KR | 20170067925 A | 6/2017 |
| WO | 2015029337 | 3/2015 |

OTHER PUBLICATIONS

English Translation of KR 20190014850 (Year: 2019).*

International Search Report for PCT/JP2021/015795 mailed Jul. 6, 2021. 3 pgs.

* cited by examiner

SIGNAL PROCESSING DEVICE, SIGNAL PROCESSING METHOD, AND DISPLAY DEVICE

CROSS-REFERENCE TO RELATED APPLICATIONS

This application is a national phase entry under 35 U.S.C. § 371 of International Application No. PCT/JP2021/015795 filed Apr. 19, 2021, which claims the priority from Japanese Patent Application No. 2020-081150 filed in the Japanese Patent Office on May 1, 2020, the entire contents of which are hereby incorporated by reference.

TECHNICAL FIELD

The present technique relates to a signal processing device, a signal processing method, and a display device, and particularly to a signal processing device, a signal processing method, and a display device capable of suppressing a temperature rise of a display panel.

BACKGROUND ART

In recent years, self-luminous display devices such as OLED display devices are becoming mainstream as display devices for displaying video. For example, PTL 1 discloses a technique for increasing the luminance of a display panel as a technique related to a display device such as a self-luminous display device.

CITATION LIST

Patent Literature

[PTL 1]
Japanese Patent Laid-open No. 2015-94795

SUMMARY

Technical Problem

Incidentally, in the display device, suppression of temperature rise of the display panel is required when the luminance of the display panel is to be increased.

This technique has been made in view of such a situation, and makes it possible to suppress the temperature rise of the display panel.

Solution to Problem

The signal processing device according to one aspect of the present technique is a signal processing device including a signal processing unit that acquires information regarding at least one of luminance enhancement time obtained by measuring time for enhancing luminance on a display panel, a temperature rise amount of the display panel, and a feature amount of a video signal according to video displayed on the display panel, when increasing the luminance of the video signal from a low-luminance display signal to a high-luminance display signal, and adaptively controls a first gain for enhancing the luminance of the video signal, according to the degree of influence on a temperature rise of the display panel in reference to the acquired information.

The signal processing method according to one aspect of the present technique is a signal processing method including, by a signal processing device, acquiring information regarding at least one of luminance enhancement time obtained by measuring time for enhancing luminance on a display panel, a temperature rise amount of the display panel, and a feature amount of a video signal according to video displayed on the display panel, when increasing luminance of the video signal from a low-luminance display signal to a high-luminance display signal, and adaptively controlling a first gain for enhancing the luminance of the video signal, according to the degree of influence on a temperature rise of the display panel in reference to the acquired information.

In the signal processing device and the signal processing method according to one aspect of the present technique, when the luminance of the video signal is increased from the low-luminance display signal to the high-luminance display signal, information is acquired with respect to at least one of the luminance enhancement time obtained by measuring the time for enhancing the luminance on the display panel, the temperature rise amount of the display panel, and the feature amount of the video signal according to the video displayed on the display panel, and the first gain for enhancing the luminance of the video signal is controlled adaptively according to the degree of influence on the temperature rise of the display panel in reference to the acquired information.

The display device according to one aspect of the present technique is a display device including a panel unit having a display panel and a signal processing unit that processes a video signal, in which, when increasing luminance of a video signal from a low-luminance display signal to a high-luminance display signal, the signal processing unit acquires information regarding at least one of luminance enhancement time obtained by measuring time for enhancing luminance on the display panel, a temperature rise amount of the display panel, and a feature amount of the video signal corresponding to video displayed on the display panel, and adaptively controls a first gain for enhancing the luminance of the video signal, according to the degree of influence on a temperature rise of the display panel in reference to the acquired information.

In the display device according to one aspect of the present technique, when the luminance of the video signal is increased from the low-luminance display signal to the high-luminance display signal, information is acquired with respect to at least one of the luminance enhancement time obtained by measuring the time for enhancing the luminance on the display panel, the temperature rise amount of the display panel, and the feature amount of the video signal corresponding to the video displayed on the display panel, and the first gain for enhancing the luminance of the video signal is adaptively controlled according to the degree of influence on the temperature rise of the display panel in reference to the acquired information.

The signal processing device and the display device according to one aspect of the present technique may be independent devices or may be internal blocks constituting one device.

DESCRIPTION OF EMBODIMENT

1. Embodiment of the Present Technique

As a technique for increasing the luminance of display devices such as OLED display devices, there is a technique for controlling a luminance enhancement gain according to an increasing integrated value by detecting the video signal switching from a signal of a low-luminance display (low-luminance signal) to a signal of a high-luminance display (high-luminance signal) (see PTL 1 described above).

Figure 1:
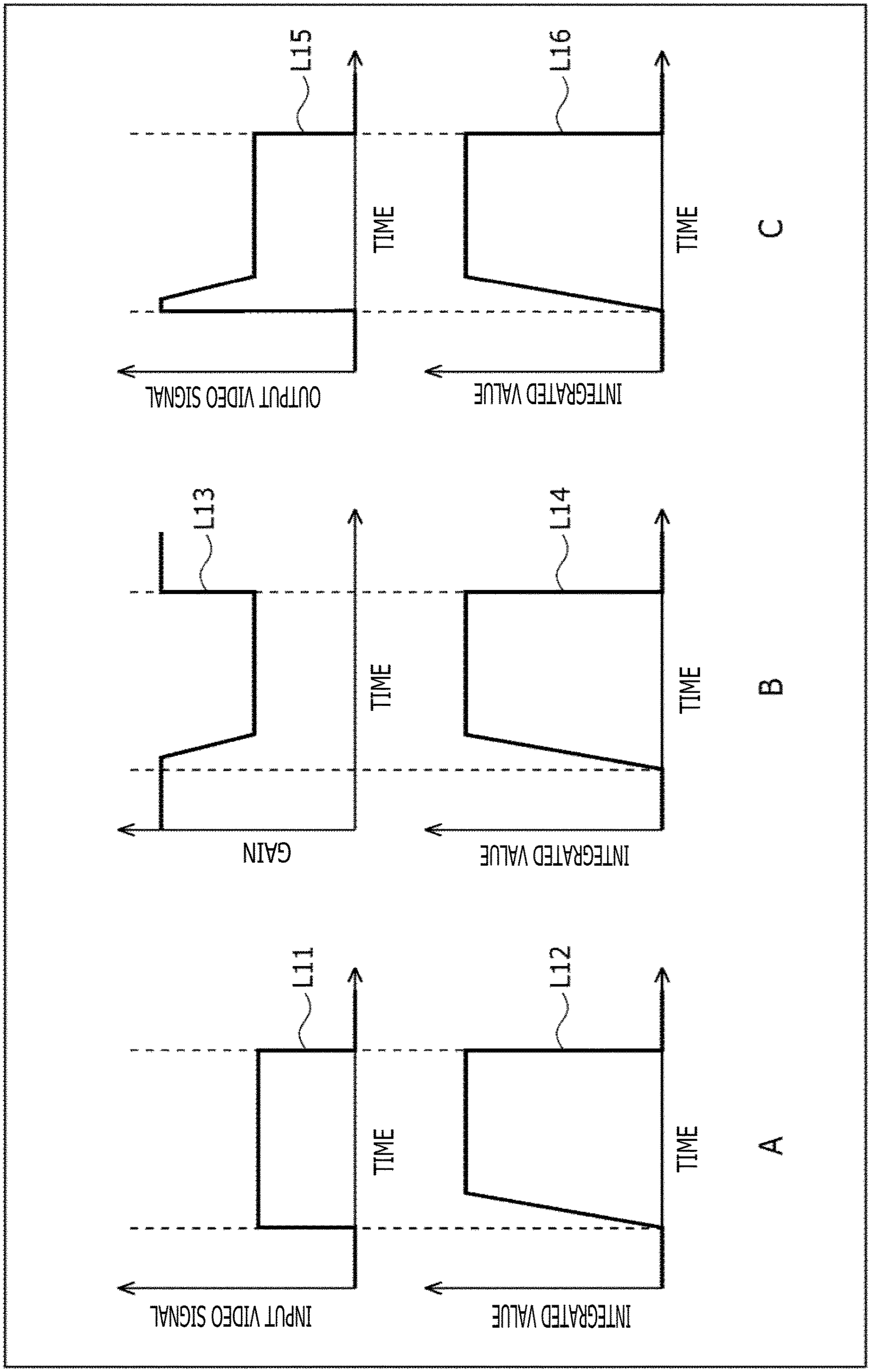
FIG. 1 depicts diagrams illustrating an example of high-luminance processing.

FIG. 1 illustrates an example of high-luminance processing to which such a technique for increasing the luminance is applied. Part A of FIG. 1 illustrates the relation between an input video signal and an integrated value by a thick line L11 and a thick line L12 on the same time axis.

Part B of FIG. 1 illustrates the relation between a gain to be multiplied by the input video signal and the integrated value by a thick line L13 and a thick line L14 on the same time axis. Part C of FIG. 1 illustrates the relation between an output video signal obtained by multiplying the input video signal by the gain and the integrated value by a thick line L15 and a thick line L16 on the same time axis.

In the case where the high-luminance processing illustrated in FIG. 1 is used, a high-luminance signal in one luminance enhancement period can be controlled, but in the case of a pattern in which the high-luminance signal is repeatedly displayed, the luminance enhancement period substantially continues on a consistent basis.

Figure 2:
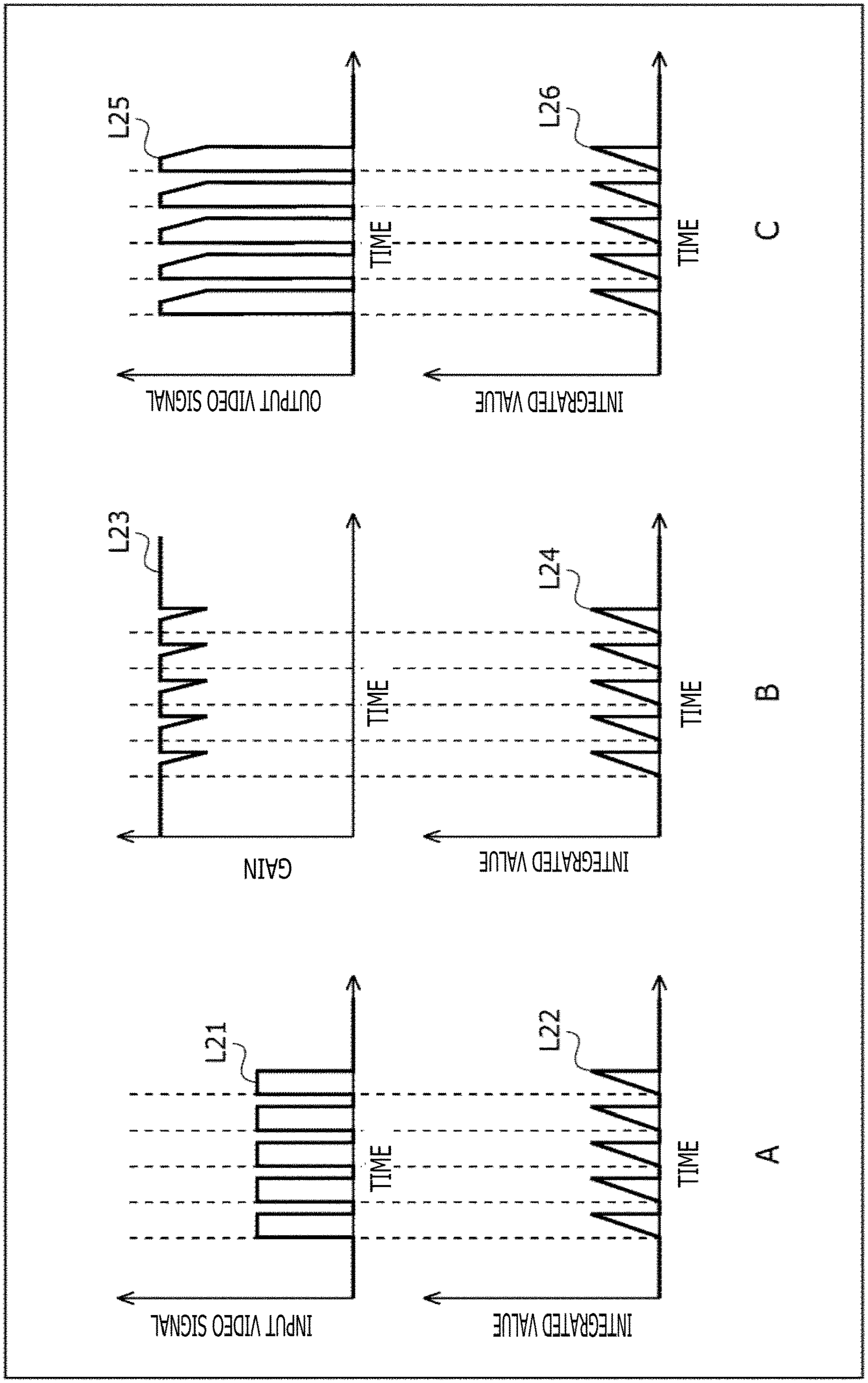
FIG. 2 depicts diagrams illustrating an example of a case where a repetitive pattern of a high-luminance signal is displayed in the high-luminance processing.

FIG. 2 illustrates an example of the case where a repetitive pattern of a high-luminance signal is displayed in the high-luminance processing. Part A of FIG. 2 illustrates the relation between the input video signal and the integrated value by a thick line L21 and a thick line L22 whose corresponding waveforms are repeated on the same time axis.

Part B of FIG. 2 illustrates the relation between the gain and the integrated value by a thick line L23 and a thick line L24 whose corresponding waveforms are repeated on the same time axis. Part C of FIG. 2 illustrates the relation between the output video signal and the integrated value by a thick line L25 and a thick line L26 whose corresponding waveforms are repeated on the same time axis.

As described above, when the pattern is such that the high-luminance signal is repeatedly displayed in the case where the high-luminance processing is used, the luminance enhancement period substantially continues on a consistent basis, and there is a risk that the temperature of the display panel rises in the display device.

In addition, since only a single luminance enhancement period is taken into consideration, there is a risk that the high-luminance processing is performed even when high-load video is displayed and the display panel is already at a high temperature.

These problems have further posed such a problem that it is necessary to set the luminance enhancement period to be short or the luminance enhancement gain to be low to the extent that the temperature rise of the display panel poses no problem and that the effect of high luminance cannot be increased.

In the OLED display device, in the case where the pixels arranged two dimensionally on the OLED display panel are WRGB pixels, W conversion (WCT: White Color Translation) is performed on the RGB video signal that is input, and normally used is a three-color lighting method in which light of a total of three colors, which includes one color of the sub-pixel W and not more than two colors of the sub-pixels R, G, and B for each pixel, is emitted.

In such a WRGB method OLED display panel, since the sub-pixel W has high efficiency without passing through a color filter unlike the sub-pixels R, G, and B, there is a method for achieving high luminance by increasing the lighting amount of the sub-pixel W. In this method, the amount of current of the sub-pixel W whose luminance has been increased can be equal to or less than the maximum amount of current of a single color of the sub-pixel R, G, or B due to the high efficiency of the sub-pixel W without a filter and the increased size of the sub-pixel W, and therefore, the problem of temperature rise of the OLED display panel is unlikely to occur.

On the other hand, in the WRGB method OLED display panel, the unused sub-pixels R, G, and B are lit after the lighting amount of the sub-pixel W is saturated, so that the four-color lighting state is set and a further high luminance is achieved. However, the load for the three sub-pixels R, G, and B increases, and the influence on the temperature rise of the OLED display panel becomes more than three times that before, so that the above-mentioned problems are more likely to occur prominently.

Figure 3:
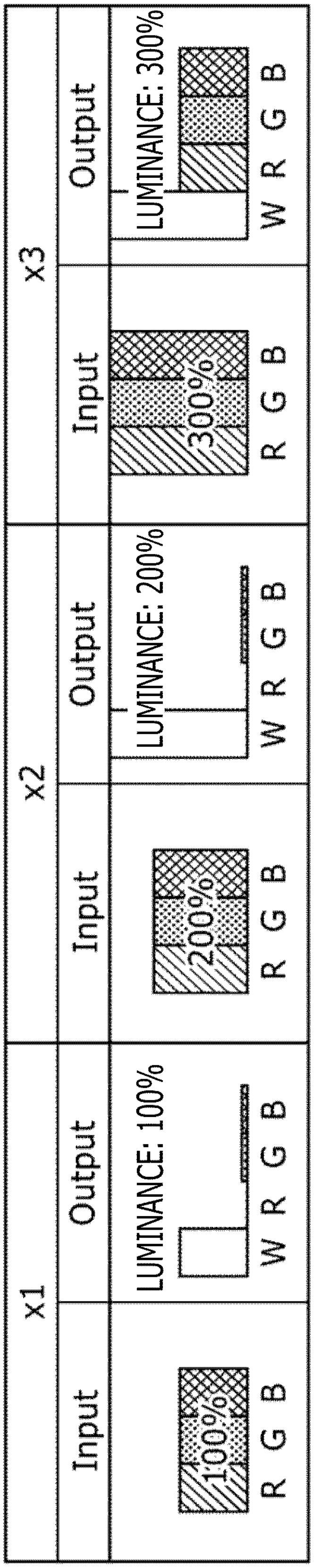
FIG. 3 is a diagram illustrating a comparative example of a three-color lighting method and a four-color lighting method.

FIG. 3 illustrates a comparative example of the three-color lighting method and the four-color lighting method. In FIG. 3, the RGB video signal to be input is represented by "Input," and the lighting of the sub-pixels W, R, G, and B based on the video signal obtained after W conversion is represented by "Output." In addition, according to the magnification of "×1," "×2," and "×3," it is illustrated that the influence on the temperature rise of the OLED display panel in the four-color lighting method of "×3" is large compared to the three-color lighting method of "×1" and "×2."

In the present technique, a method is proposed for solving the problem of the temperature rise, which is a problem when the luminance of the display panel is increased as described above. Hereinafter, an embodiment of the present technique will be described with reference to the drawings.

(Device Configuration)

Figure 4:
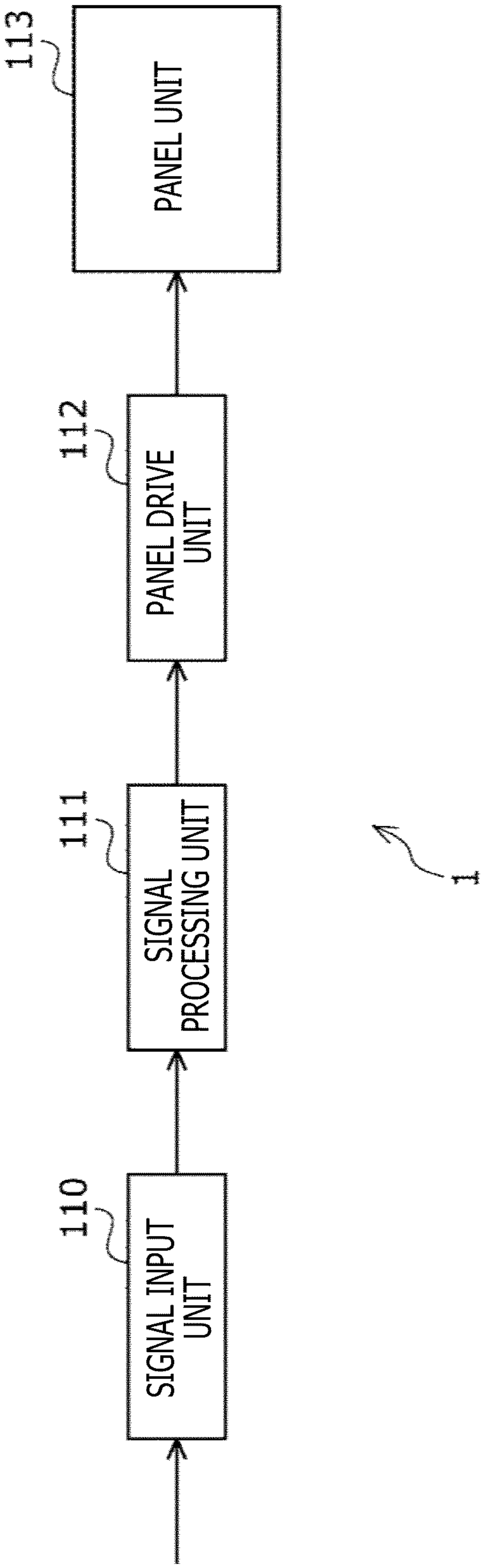
FIG. 4 is a block diagram illustrating a configuration example of an embodiment of a display device to which the present technique is applied.

FIG. 4 illustrates a configuration example of an embodiment of a display device to which the present technique is applied.

A display device 1 is a self-luminous display device such as an OLED display device having an OLED display panel. The display device 1 is configured as a television receiver, a display device, or the like.

In FIG. 4, the display device 1 includes a signal input unit 110, a signal processing unit 111, a panel drive unit 112, and a panel unit 113.

The signal input unit 110 includes a tuner connected to an antenna, a communication module connectable to a communication network such as the Internet, an input interface conforming to a predetermined standard, or the like.

The signal input unit 110 supplies, to the signal processing unit 111, video signals of various kinds of content such as broadcast content transmitted by terrestrial broadcasting, satellite broadcasting, etc., communication content streamed via a communication network such as the Internet, or recorded content recorded in a recording medium such as an optical disk or a semiconductor memory, a recorder, or the like.

The signal processing unit 111 performs video signal processing on the video signal for the content supplied from the signal input unit 110, and supplies the video signal obtained as a result to the panel drive unit 112. In this video signal processing, for example, high-luminance processing for changing the video signal from a signal of low-luminance display (low-luminance signal) to a signal of high-luminance display (high-luminance signal) is performed.

The panel drive unit 112 drives the panel unit 113 in reference to the video signal supplied from the signal processing unit 111.

The panel unit 113 includes a display panel such as an OLED display panel. The panel unit 113 displays video according to the video of various kinds of content in association with the drive from the panel drive unit 112.

The OLED display panel is a display panel in which pixels including an OLED element as a self-luminous element are arranged two-dimensionally. The OLED (Organic Light Emitting Diode) is a light emitting element having a structure in which an organic light emitting material is sandwiched between a cathode and an anode, and constitutes pixels (display pixels) arranged two-dimensionally on an OLED display panel.

In the OLED display panel, each pixel (display pixel) includes four sub-pixels of white (W), red (R), green (G), and blue (B) in the case of the WRGB method, and includes three sub-pixels of red (R), green (G), and blue (B) in the case of the RGB method.

Incidentally, in the configuration illustrated in FIG. 4, the minimum configuration unit is illustrated for simplifying the description, but other circuits, devices, and the like, such as a sound signal processing circuit that processes a sound signal and a speaker that outputs a sound corresponding to the sound signal, may be included.

Figure 5:
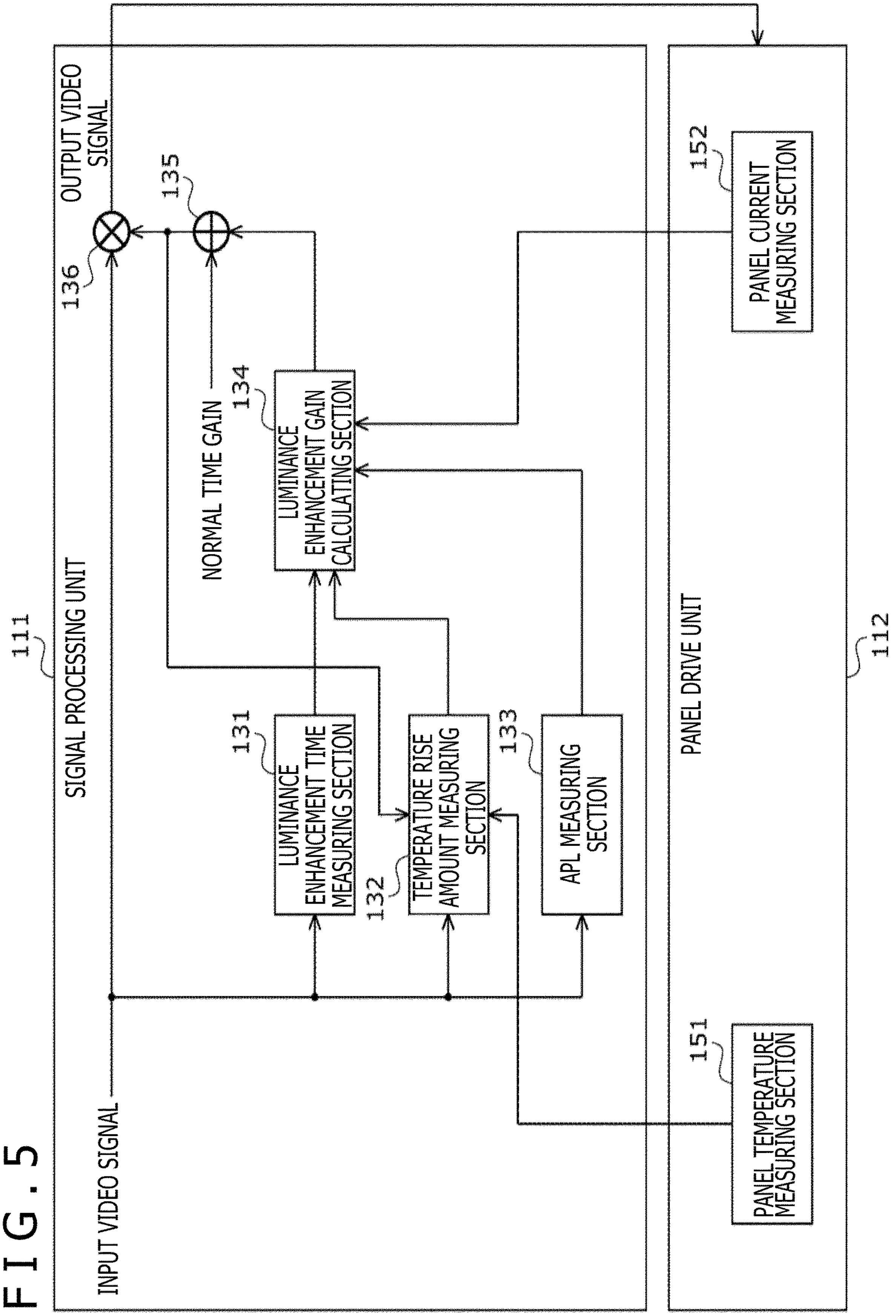
FIG. 5 is a block diagram illustrating a detailed configuration example of a signal processing unit.

FIG. 5 illustrates a detailed configuration example of the signal processing unit 111 illustrated in FIG. 4.

In FIG. 5, the signal processing unit 111 includes a luminance enhancement time measuring section 131, a temperature rise amount measuring section 132, an APL measuring section 133, a luminance enhancement gain calculating section 134, an adding section 135, and a multiplying section 136.

In the signal processing unit 111, the input video signal from the signal input unit 110 is supplied to each of the luminance enhancement time measuring section 131, the temperature rise amount measuring section 132, the APL measuring section 133, and the multiplying section 136.

The luminance enhancement time measuring section 131 performs the luminance enhancement time measurement processing according to the video signal input therein, and supplies the measurement result of the luminance enhancement time obtained as a result to the luminance enhancement gain calculating section 134. In this luminance enhancement time measurement processing, the time for enhancing the luminance on the display panel is measured. The details of the luminance enhancement time measurement processing will be described later with reference to FIGS. 6 and 7.

The temperature rise amount measuring section 132 performs the temperature rise amount measurement processing in reference to the video signal input therein and the luminance enhancement magnification, and supplies the measurement result of the temperature rise amount obtained as a result to the luminance enhancement gain calculating section 134. As the luminance enhancement magnification, the luminance enhancement magnification according to the gain to be multiplied by the input video signal is fed back and input. The amount of the temperature rise here is regarded as the amount of a short-term temperature rise.

Further, the temperature rise amount measuring section 132 can use the measurement result of the surface temperature of the display panel supplied from the panel drive unit 112, when performing the temperature rise amount measurement processing. The details of the temperature rise amount measurement processing will be described later with reference to FIGS. 8 to 12.

The APL measuring section 133 performs APL measurement processing in reference to the video signal input therein, and supplies the APL measurement result obtained as a result to the luminance enhancement gain calculating section 134. In this APL measurement processing, APL (Average Picture Level) is measured as a feature amount of a video signal corresponding to the video displayed on the display panel. Details of the APL measurement processing will be described later with reference to FIG. 13.

The measurement result of the luminance enhancement time from the luminance enhancement time measuring section 131, the measurement result of the temperature rise amount from the temperature rise amount measuring section 132, and the APL measurement result from the APL measuring section 133 are supplied to the luminance enhancement gain calculating section 134. The luminance enhancement gain calculating section 134 performs the luminance enhancement gain calculation processing in reference to the measurement results of the luminance enhancement time, the temperature rise amount, and the APL, and supplies the luminance enhancement gain obtained as a result to the adding section 135.

Further, the luminance enhancement gain calculating section 134 can use the measurement result of the current flowing through the display panel supplied from the panel drive unit 112, for performing the luminance enhancement gain calculation processing. The details of the luminance enhancement gain calculation processing will be described later with reference to FIGS. 15 to 17.

The adding section 135 adds the luminance enhancement gain from the luminance enhancement gain calculating section 134 to the normal time gain, and supplies the resulting high-luminance gain to the multiplying section 136.

The normal time gain is a gain to be multiplied by the input video signal, and is a gain for converting the input video signal into a high-luminance display signal. For example, as the normal time gain, the luminance enhancement gain of the three-color lighting region of the WRGB method is set, so that the input video signal is always made to have high luminance.

Here, by adding a supplementary luminance enhancement gain to the normal time gain, a further increase in luminance of the input video signal is achieved. For example, adding the luminance enhancement gain makes it possible to adaptively switch between the three-color lighting and the four-color lighting of the WRGB method. This supplementary luminance enhancement gain is adaptively controlled according to measurement results of the luminance enhancement time, the short-term temperature rise amount, the APL, and the current load.

The multiplying section 136 multiplies the input video signal by the high-luminance gain from the adding section 135, and supplies the output video signal obtained as a result to the panel drive unit 112.

In FIG. 5, the panel drive unit 112 may include a panel temperature measuring section 151 and a panel current measuring section 152.

The panel temperature measuring section 151 includes a temperature sensor or the like provided on the panel unit 113. The panel temperature measuring section 151 measures the surface temperature of the display panel, and supplies the measurement result to the temperature rise amount measuring section 132 of the signal processing unit 111. A configuration example of the temperature sensor will be described later with reference to FIGS. 11 and 12.

The panel current measuring section 152 includes a current sensor or the like provided on the panel unit 113. The panel current measuring section 152 measures the current applied to the display panel, and supplies the measurement result to the luminance enhancement gain calculating section 134 of the signal processing unit 111.

It is to be noted that the configuration of the signal processing unit 111 illustrated in FIG. 5 is an example, and the minimum configuration unit thereof can have a configuration including the luminance enhancement time measuring section 131, the luminance enhancement gain calculating section 134, the adding section 135, and the multiplying section 136, for example.

Even by control of the luminance enhancement gain with such a minimum configuration, the length of time during which the luminance is higher than usual, such as lighting time of four colors, can be controlled. In addition, combining the control with this minimum configuration with the control using other measurement results makes it possible to suppress temperature rise even in a display pattern in which the temperature rise is severe or enhance the high luminance effect in a state where the temperature has a margin, for example.

(Measurement of Luminance Enhancement Time)

In the case of performing high-luminance processing using a supplementary luminance enhancement gain, since the current load for increasing the luminance is high and the influence on the temperature rise of the display panel is large, the high-luminance processing cannot be carried out for a long period of time in the same location (area) on the screen of the display panel. Therefore, it is necessary to measure the luminance enhancement time for each predetermined area on the screen of the display panel and control the luminance enhancement gain according to the luminance enhancement time.

When measuring the luminance enhancement time, the luminance enhancement time measuring section 131 calculates an integration step value corresponding to the input video signal level, and integrates the integration step values in the time axis direction. The integrated value calculated in such a way corresponds to the luminance enhancement time.

Figure 6:
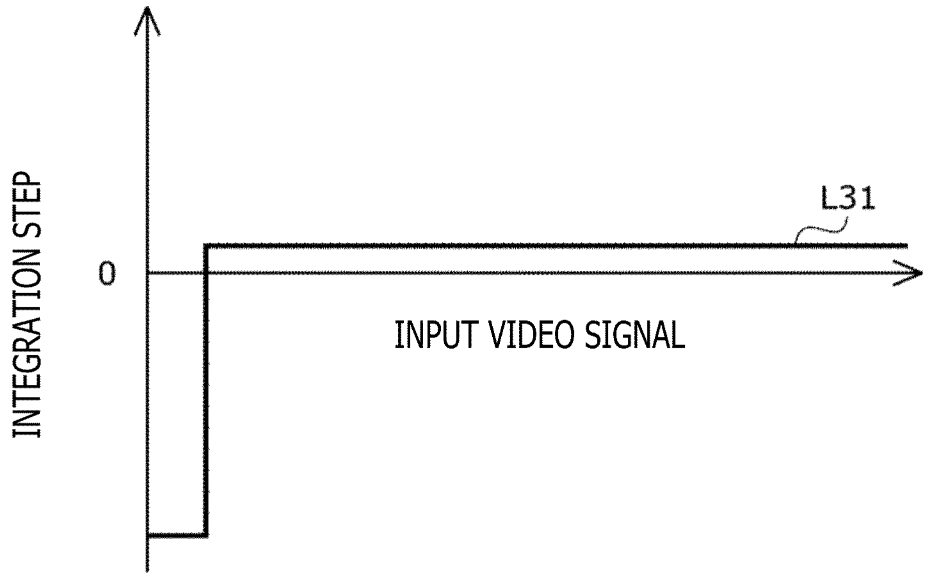
FIG. 6 is a diagram illustrating a relation between an input video signal and an integration step.
Figure 7:
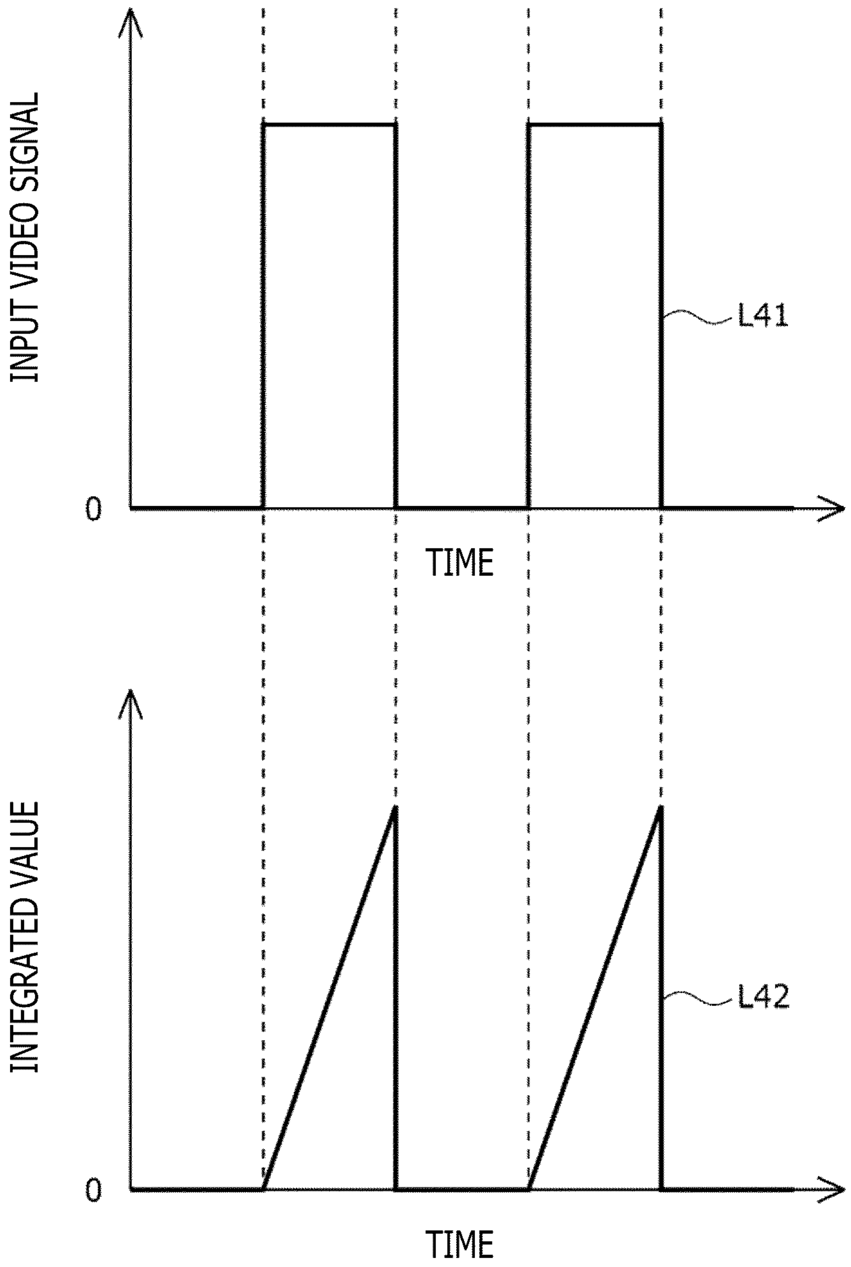
FIG. 7 is a diagram illustrating a relation between the input video signal and an integrated value.

FIG. 6 illustrates by a thick line L31 the relation between the input video signal and the integration step value when the input video signal is put on the horizontal axis and the integration step is put on the vertical axis. Further, FIG. 7 illustrates the relation between the input video signal and the integrated value by a thick line L41 and a thick line L42 on the same time axis. That is, FIG. 7 illustrates the state of integration representing the luminance enhancement time.

As described above, the integrated value calculated by the luminance enhancement time measuring section 131 corresponds to the luminance enhancement time, and the luminance enhancement gain calculating section 134 can control the supplementary luminance enhancement gain according to the luminance enhancement time. That is, here, the processing can be performed in a similar manner as the high-luminance processing to which the technique for increasing the luminance illustrated in FIG. 1 is applied.

Note that the area on the screen of the display panel may be an area obtained by dividing the area of the entire screen into multiple areas having predetermined sizes in the vertical direction and the horizontal direction, for example. To be specific, the area can be an area corresponding to a divided area A in FIG. 12, or the like which will be described later.

(Measurement of Temperature Rise Amount)

As described in the above-mentioned problem, mere measurement of the luminance enhancement period poses the problem of a temperature rise that occurs in the case where the high-luminance processing is performed frequently such as a repetitive display pattern. Therefore, control is necessary for measuring the amount of the temperature rise due to the high-luminance processing and feeding the amount back to the luminance enhancement gain such that the amount of the temperature rise becomes equal to or less than a certain amount.

Figure 8:
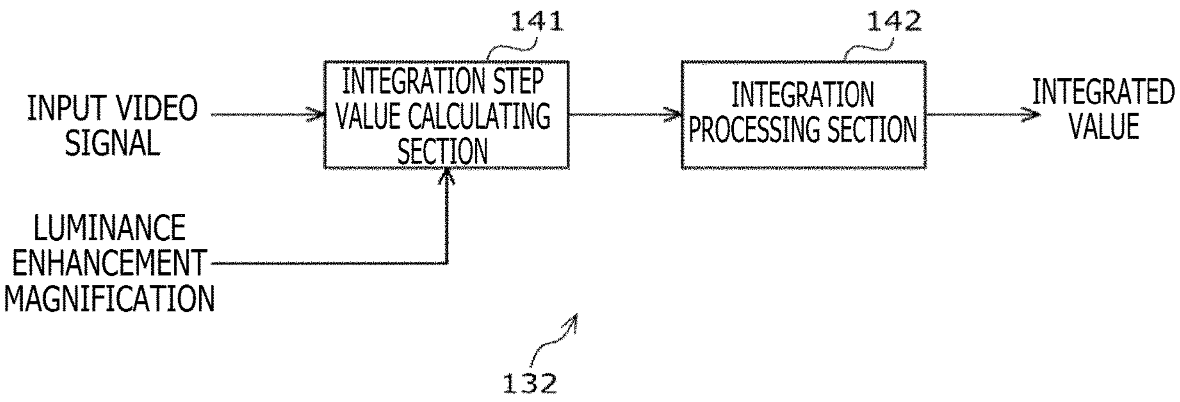
FIG. 8 is a diagram illustrating an example of a method for measuring the amount of a temperature rise by a temperature rise amount measuring section.

FIG. 8 illustrates an example of a method for measuring the amount of a temperature rise by the temperature rise amount measuring section 132. In FIG. 8, the temperature rise amount measuring section 132 has an integration step value calculating section 141 and an integration processing section 142.

The input video signal and the luminance enhancement magnification are input to the integration step value calculating section 141. The integration step value calculating section 141 calculates the step value to be used when the integration processing is performed according to the load increased by the high-luminance processing.

Figure 9:
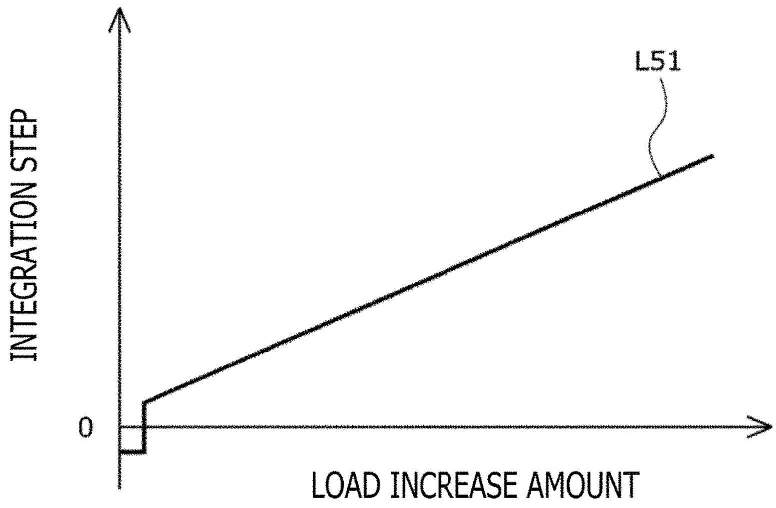
FIG. 9 is a diagram illustrating an example of an integration step value according to a load increase amount.

Here, in order to correlate the integration step value with the temperature rise, the positive integration step value in a high load state is set to be larger than the predetermined value in association with the temperature that rapidly rises in the high load state, and the negative integration step value in a low load state is set to be smaller than the predetermined value in association with the temperature that slowly drops in the low load state in which the load is lower than the high load state. FIG. 9 illustrates by a thick line L51 the relation between the load increase amount and the integration step value when the load increase amount is put on the horizontal axis and the integration step is put on the vertical axis.

Figure 10:
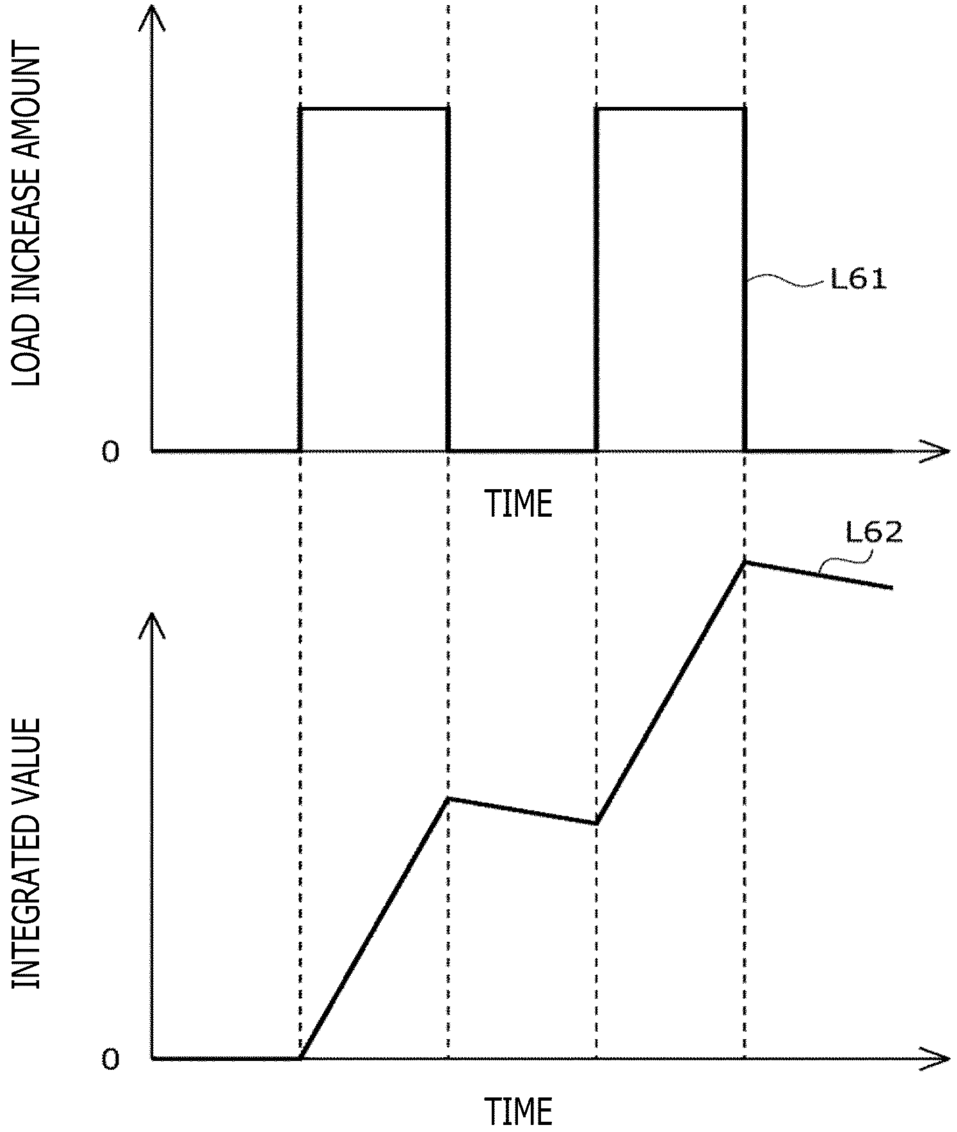
FIG. 10 is a diagram illustrating a relation between the amount of a temperature rise and an example of an integrated value.

The integration processing section 142 integrates the integration step values in the time axis direction and calculates an integrated value that correlates with the temperature rise. FIG. 10 illustrates the relation between the load increase amount and the integrated value by a thick line L61 and a thick line L62 on the same time axis. That is, FIG. 10 illustrates the state of integration in which the temperature rise is taken into consideration, and the integrated value represents the amount of the temperature rise accompanying the increase in luminance.

The temperature rise amount measuring section 132 performs these types of processing for each predetermined area on the screen of the display panel, and calculates the integrated value for each predetermined area, so that it is possible to detect a state in which the high-luminance processing is performed in a concentrated manner at the same location (an area) in a short period of time and the temperature is rising.

Note that, also here, as the area on the screen of the display panel, an area obtained by dividing the entire screen into multiple areas having predetermined sizes in the vertical direction and the horizontal direction can be employed, for example. To be specific, the area can be an area corresponding to the divided area A in FIG. 12, which will be described later.

By such processing, the temperature rise due to the increase in luminance can be detected, but since the temperature influence due to the normal video display and the ambient temperature is not taken into consideration, there is a possibility that the high-luminance processing will be performed when the display panel is in a high temperature state.

As such, the load of the video by signal processing is predicted, or the actual surface temperature of the display panel is measured by a temperature sensor or the like, and the integrated value for each predetermined area on the screen of the display panel is determined in light of information regarding the temperature obtained there, so that the accuracy can be further enhanced.

Only one temperature sensor may be attached to the panel unit 113 for supplementary information for load prediction by signal processing, or multiple sensors may be attached to the panel unit 113 for the purpose of improving the accuracy of supplementary information or measuring directly without load prediction by signal processing.

Figure 11:
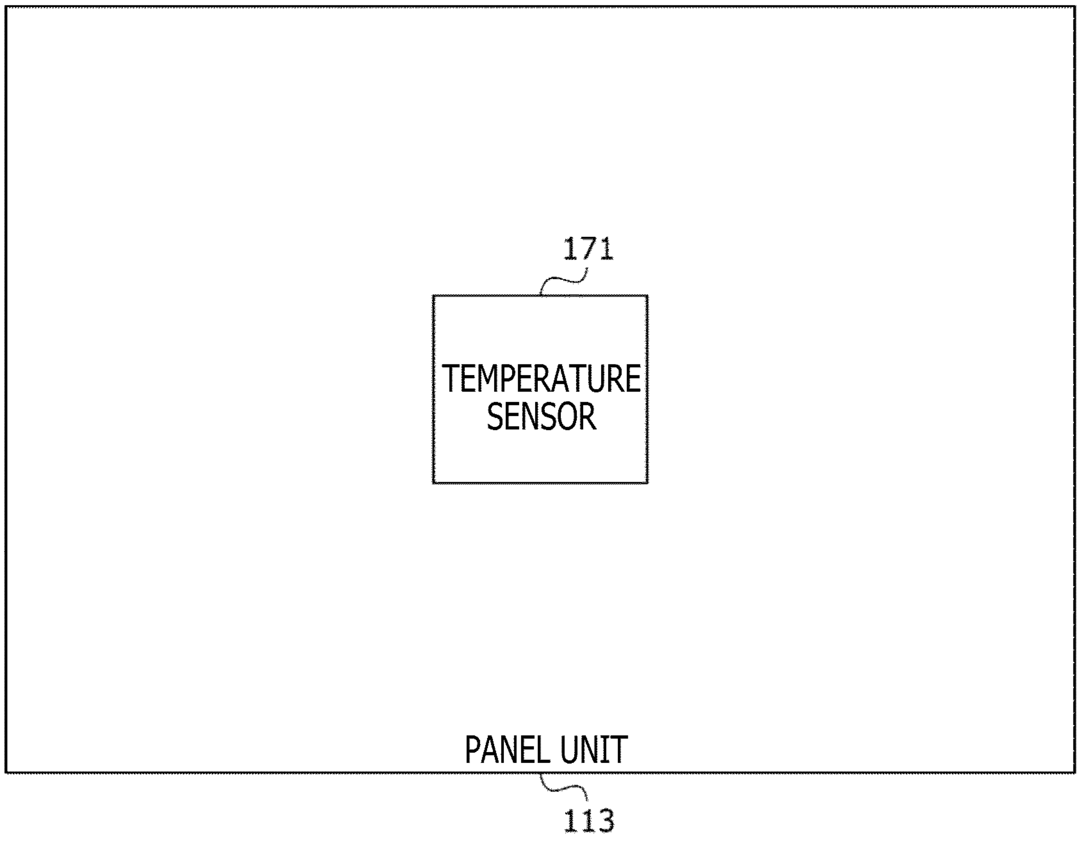
FIG. 11 is a diagram illustrating a configuration example of one temperature sensor provided in a panel unit.

FIG. 11 illustrates a configuration example of one temperature sensor provided in the panel unit 113. In FIG. 11, a temperature sensor 171 is attached at a position corresponding to a substantially central portion of the screen of the display panel, and measures the surface temperature of the display panel. Note that the temperature sensor 171 may be mounted in a position not limited to the position corresponding to the substantially central portion of the screen; the temperature sensor 171 may be mounted in another position.

Figure 12:
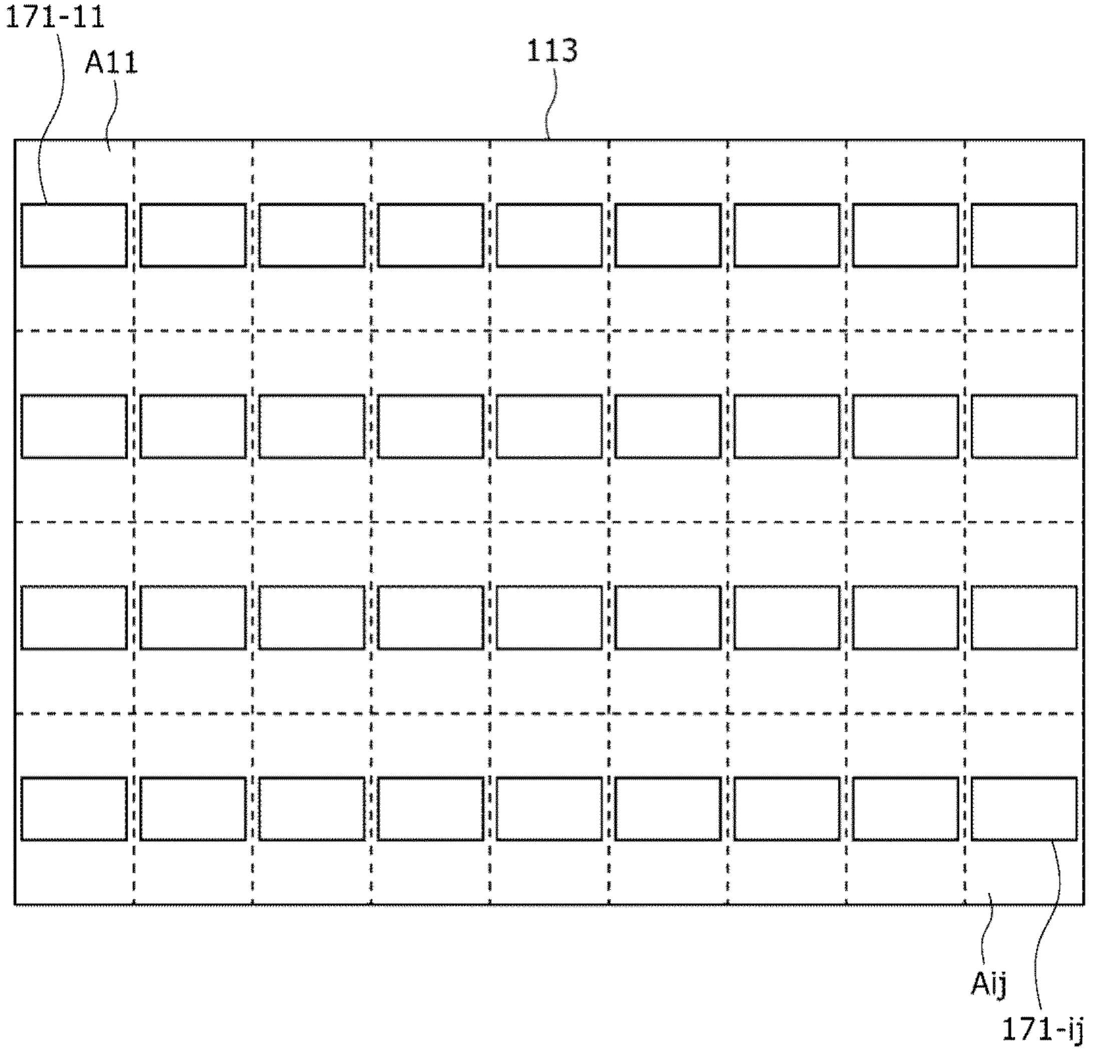
FIG. 12 is a diagram illustrating a configuration example of multiple temperature sensors provided in a panel unit.

FIG. 12 illustrates a configuration example of multiple temperature sensors provided in the panel unit 113. FIG. 12 illustrates an example in which the entire screen area of the display panel is divided into 4×9 areas having the same size in the vertical direction and the horizontal direction, and the temperature sensor 171 is attached to each divided area. Incidentally, for convenience of description, a broken line indicating the boundary of the divided areas is illustrated on the screen of the display panel.

In FIG. 12, the numbers corresponding to the vertical direction and the horizontal direction of the divided area A are described in a divided area A11 at the upper left and a divided area Aij at the lower right on the screen of the display panel. Further, the numbers corresponding to the vertical direction and the horizontal direction of the temperature sensor 171 are described in an upper left temperature sensor 171-11 and a lower right temperature sensor 171-*ij*.

However, in these notations, i represents a vertical number and j represents a horizontal number. That is, FIG. 12 illustrates an example in which the screen of the display panel is divided into 4×9 divided areas, but the screen can be divided into i×j (i, j: integer of 1 or more) divided areas A, and the number of divided areas A to which the temperature sensors 171 are attached is optional.

In FIG. 12, the temperature sensor 171-11 measures the surface temperature of the divided area A11 in the screen of the display panel. Although the description thereof will be omitted because it has been mentioned before, the temperature sensor 171-*ij* other than the temperature sensor 171-11 similarly measures the surface temperature of the divided area Aij corresponding to the mounting position.

The temperature sensor 171 in FIG. 11 and the temperature sensors 171-11 to 171-*ij* in FIG. 12 correspond to the panel temperature measuring section 151 in FIG. 5. In the case where multiple temperature sensors 171-11 to 171-*ij* are attached, the surface temperature of the display panel can be measured more accurately than in the case where one temperature sensor 171 is attached.

(Measurement of APL)

APL (Average Picture Level) represents the average signal level in the target area on the screen of the display panel. When the entire screen of the display panel is in a high APL state, the total amount of load increase due to the high-luminance processing is large, and since the original total load is also large, the influence of increase in luminance on the temperature rise is large. The high APL state represents a state in which the APL value is higher than a predetermined value, that is, a state in which the signal level of the video signal is high.

On the other hand, when the entire screen of the display panel is in a low APL state, the total amount of load increase amount due to the high-luminance processing is small, and the influence on the temperature rise of the entire screen is small, but for a video signal whose signal level is locally high such as a window signal in which signals are concentrated in one place on the screen, as the amount of luminance enhancement becomes larger, the influence on the temperature rise becomes greater. The low APL state represents a state in which the APL value is lower than a predetermined value, that is, a state in which the signal level of the video signal is low.

Figure 13:
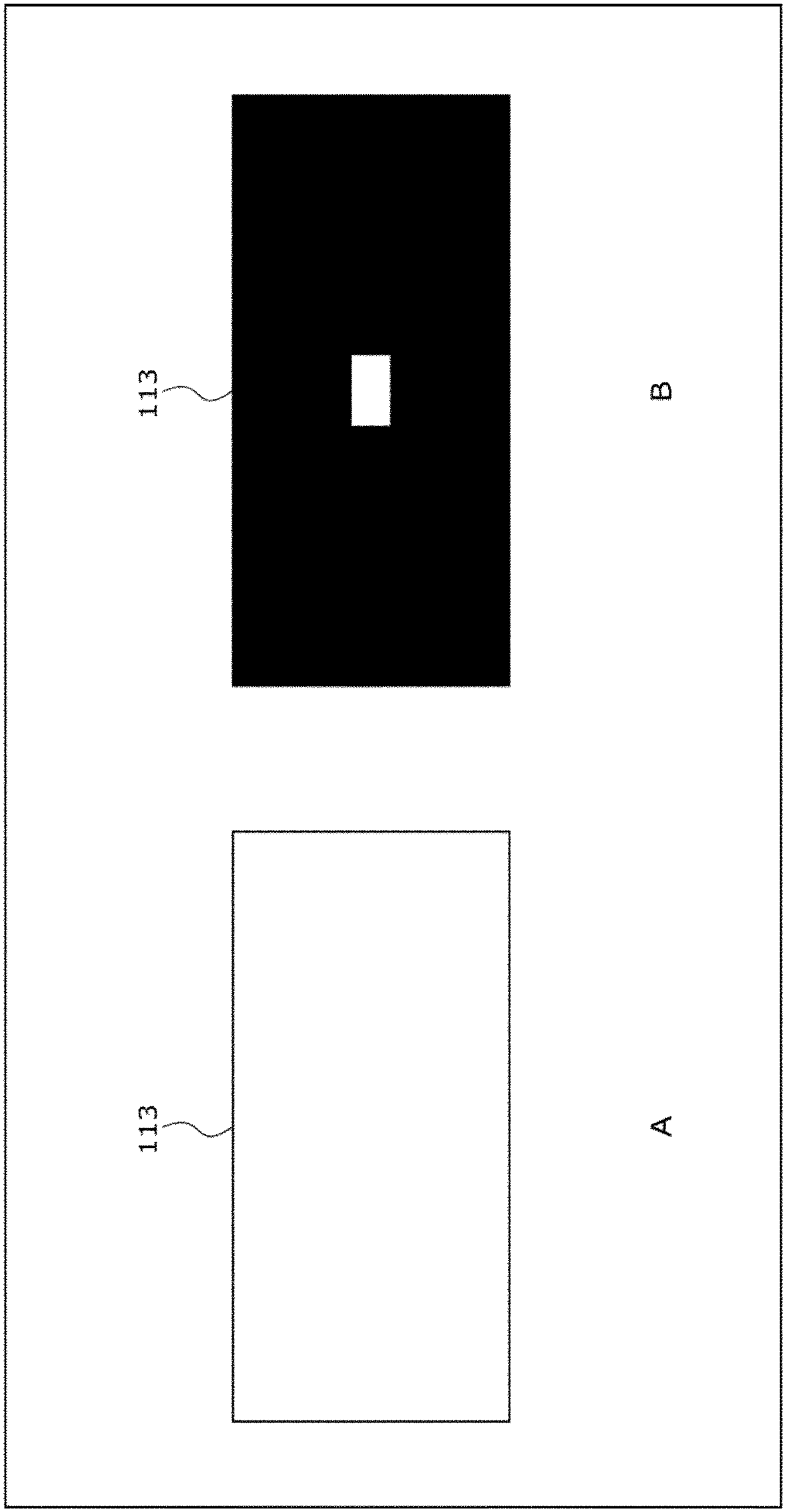
FIG. 13 depicts diagrams illustrating an example of a video signal that greatly affects the temperature rise.

FIG. 13 illustrates an example of a video signal that greatly affects the temperature rise. Part A of FIG. 13 illustrates a case where the entire screen of the display panel indicates video corresponding to the video signal in a high signal level state. Part B of FIG. 13 illustrates a case where the local area in the substantially central portion of the display panel screen (white region in the figure) indicates video corresponding to the video signal in a high signal level state.

In order to detect such a display pattern having a large influence on a temperature rise and control the luminance enhancement gain, the APL measuring section 133 measures the APL of the entire screen or each predetermined area of the display panel.

Also here, as the area on the screen of the display panel, the area obtained by dividing the entire screen into multiple areas having predetermined sizes in the vertical direction and the horizontal direction can be employed, for example. To be specific, an area corresponding to the divided area A in FIG. 12 described above can be used.

(Measurement of Current Load)

The OLED display panel has a different current load for the lighting amount of each pixel (OLED element thereof) arranged two-dimensionally. If the amount of load increase due to the high-luminance processing is calculated only by the above-mentioned APL measurement, it is difficult to take into consideration the difference between these current loads. Hence, measuring the current flowing through the OLED display panel with a current sensor or the like is expected to enhance the accuracy.

For example, in the case of video of a low current load in which the APL is high but sub-pixel W is used greatly, the amount of load increase due to the high-luminance processing is small, so that it is sufficient if the luminance enhancement gain calculating section 134 performs such control as to relieve the suppression of the luminance enhancement gain according to the measurement result of the APL.

Figure 14:
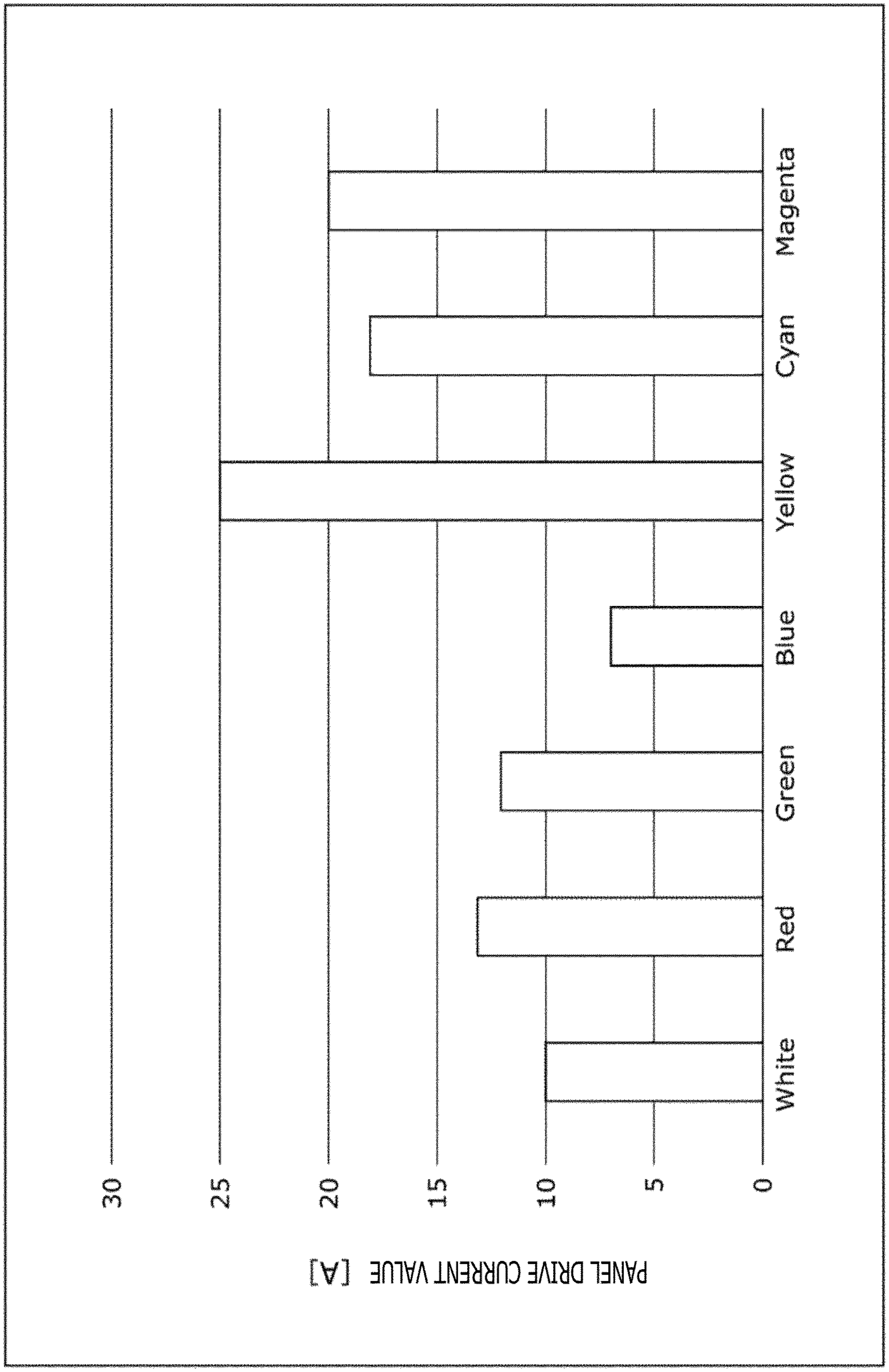
FIG. 14 is a diagram illustrating the relation between a color component of each pixel and a current value.

FIG. 14 illustrates the relation between the color component of each pixel and the current value. In FIG. 14, the horizontal axis represents the colors of the sub-pixels (White, Red, Green, and Blue) and the colors when the sub-pixels are lit in two colors (Yellow, Cyan, and Magenta), and the vertical axis represents the panel drive current value. In each pixel, lighting of the sub-pixels R and G makes yellow (Y), lighting of the sub-pixels R and B makes magenta (M), and lighting of the sub-pixels G and B makes cyan (C).

From this bar graph, it can be recognized that the panel drive current value differs for each color component. In particular, in yellow (Y), magenta (M), and cyan (C), since two colors of the sub-pixels are lit, the increase in the panel drive current value becomes remarkable, and thus the luminance enhancement gain is controlled in consideration of these.

(Calculation of Luminance Enhancement Gain)

The luminance enhancement gain calculating section 134 suppresses the temperature rise of the display panel at the time of increasing the luminance of the display panel, by controlling the luminance enhancement gain according to the degree of influence on the temperature rise of each element (luminance enhancement time, temperature rise amount, APL, and current load). Examples of gain setting for each element are illustrated in FIGS. 15 to 17.

Figure 15:
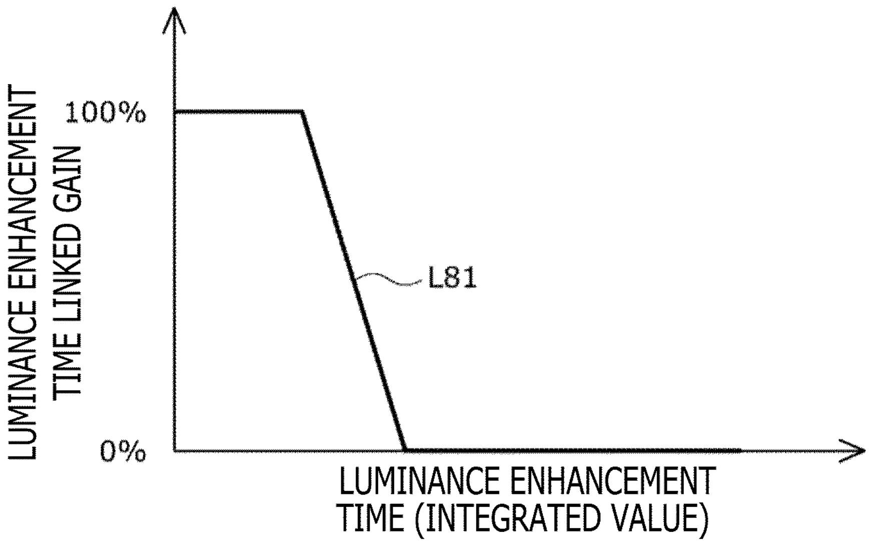
FIG. 15 is a diagram illustrating an example of gain setting for luminance enhancement time.

FIG. 15 illustrates an example of setting the gain for the luminance enhancement time. In FIG. 15, the horizontal axis represents the luminance enhancement time (integrated value), and the vertical axis represents a luminance enhancement time linked gain.

In FIG. 15, the gain according to the luminance enhancement time is illustrated by a thick line L81 including a straight line from top left to bottom right, and the luminance enhancement time linked gain is maintained at 100% until the integrated value reaches a predetermined value, but gradually decreases with a predetermined slope after the integrated value exceeds the predetermined value, and then continues to be 0% after decreasing to 0%.

Figure 16:
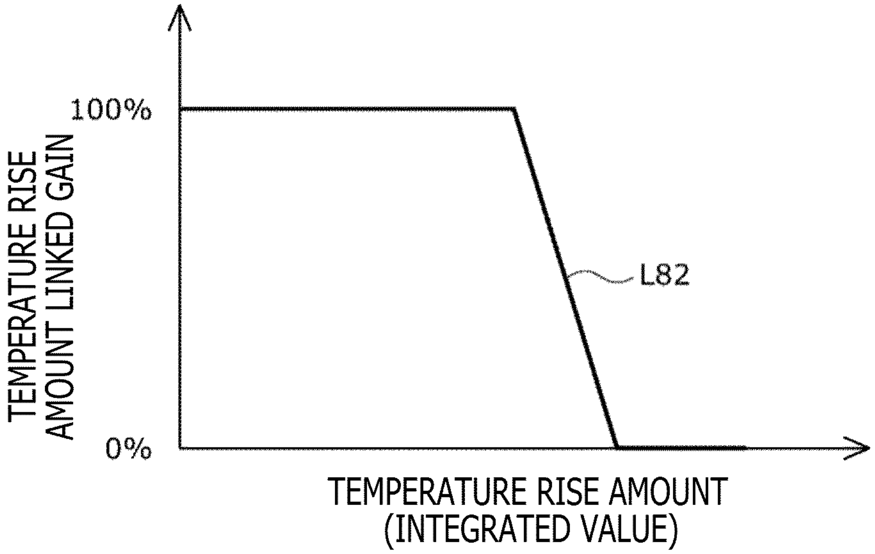
FIG. 16 is a diagram illustrating an example of gain setting for the amount of a temperature rise.
Figure 17:
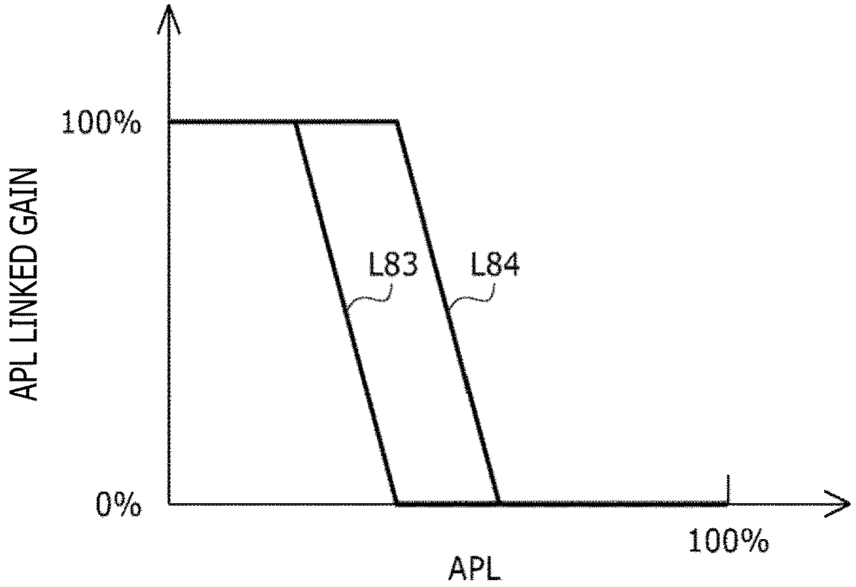
FIG. 17 is a diagram illustrating an example of gain setting for an APL.

FIG. 16 illustrates an example of setting the gain with respect to the amount of a temperature rise. In FIG. 16, the horizontal axis represents the temperature rise amount (integrated value), and the vertical axis represents the temperature rise amount linked gain.

In FIG. 16, the gain according to the amount of the temperature rise is illustrated by a thick line L82 including a straight line from top left to bottom right, and this gain of the temperature rise amount is maintained at 100% until the integrated value reaches a predetermined value, but gradually decreases with a predetermined slope after the integrated value exceeds the predetermined value, and continues to be 0% after decreasing to 0%.

FIG. 17 illustrates an example of gain setting for the APL. In FIG. 17, the horizontal axis represents the APL, and the vertical axis represents an APL linked gain. The value of APL on the horizontal axis is a value in the range of 0% to 100%.

In FIG. 17, the gain corresponding to the APL is illustrated by thick lines L83 and L84 each including a straight line from top left to bottom right. The thick line L83 illustrates the APL linked gain in the case where the measured amount of the current load is high, and the thick line L84 illustrates the APL linked gain in the case where the measured amount of the current load is low.

As illustrated by the thick lines L83 and L84, the APL linked gain is maintained at 100% until the APL value reaches a predetermined value, but gradually decreases with a predetermined slope after the APL value exceeds the predetermined value, and continues to be 0% after decreasing to 0%.

Further, the APL value of the thick line L83 until the APL linked gain decreases is smaller than that of the thick line L84, and in the case where the measured amount of the current load is high, the APL linked gain decreases with a smaller APL value. Note that, in this example, the case where the current load measurement is taken into consideration for the APL linked gain is illustrated, but the APL linked gain according to the APL may be set without the current load taken into consideration.

The luminance enhancement gain calculating section 134 sets such linked gains, and sets a value obtained by multiplying these linked gain values, a minimum value in these linked gain values, or the like as the final luminance enhancement gain, for example.

(Adaptive Gain Control)

Figure 18:
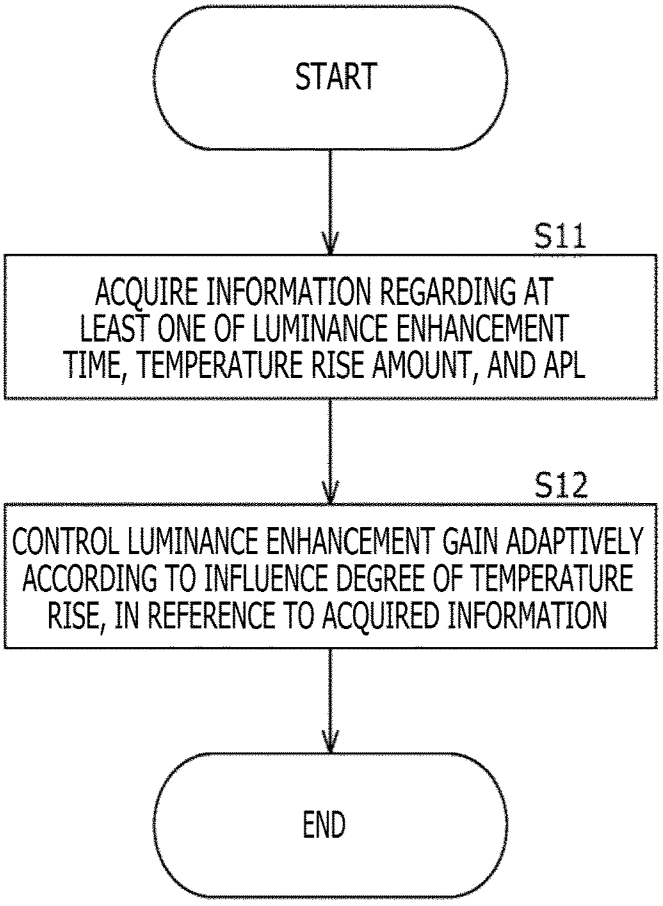
FIG. 18 is a flowchart illustrating a flow of luminance enhancement gain control processing.

FIG. 18 is a flowchart illustrating the flow of the luminance enhancement gain control processing carried out by the signal processing unit 111.

In step S11, the luminance enhancement gain calculating section 134 acquires information regarding at least one of the measurement result of the luminance enhancement time, measurement result of the temperature rise amount, and measurement result of the APL. Here, as supplementary information of the APL, the measurement result of the current flowing through the display panel may be acquired.

In step S12, the luminance enhancement gain calculating section 134 adaptively controls the luminance enhancement gain according to the degree of influence on the temperature rise in reference to the acquired information.

For example, the luminance enhancement gain calculating section 134 sets, as the final luminance enhancement gain, the value obtained by multiplying the luminance enhancement time linked gain according to the luminance enhancement time (integrated value), the temperature rise amount linked gain according to the temperature rise amount (integrated value), and the APL linked gain according to the APL together.

As described above, in the signal processing unit 111, when the luminance of the video signal is increased from the low-luminance display signal to the high-luminance display signal, the luminance enhancement gain is controlled adaptively while the degree of influence on the temperature rise of the display panel is estimated, in reference to information regarding at least one of the luminance enhancement time obtained by measuring the time for enhancing the luminance on the display panel, the short-term temperature rise amount on the display panel, and the feature amount of the video signal according to the video displayed on the display panel (for example, an APL).

As a result, it is possible to solve the problem of the temperature rise, which is a problem when the luminance of the display panel is increased, and to suppress the temperature rise of the display panel. In particular, in the WRGB method OLED display panel, even in the case where the unused sub-pixels R, G, and B are lit, after the lighting amount of the sub-pixel W is saturated, so that further high luminance is achieved by the four-color lighting state, the influence on the temperature rise of the OLED display panel can be suppressed.

2. Modification Example

In the above description, the signal processing unit 111 has been described as a component of the display device 1, but the signal processing unit 111 may be regarded as a single device and may assumed to be a signal processing device.

In the above description, the case where the display device 1 is a television receiver is illustrated, but the present invention is not limited to this, and the display device 1 may be a device such as a display device. The display device includes a monitor for medical use, a monitor for broadcasting, and a display for digital signage, for example.

In addition, the display device 1 may be used as a display unit of a PC (Personal Computer), a tablet terminal, a smartphone, a mobile phone, a game machine, a head-mounted display, an in-vehicle device such as a car navigation system or a monitor for a rear seat, a wearable device of a wristwatch type or a spectacle type, and the like.

In the above description, as the display device 1, an OLED display device having an OLED display panel is exemplified, but the present technique can also be applied to a display device such as a self-luminous display device having another self-luminous display panel.

In the above description, the case where the pixels arranged two-dimensionally on the panel unit 113 (display panel thereof) each include four sub-pixels of white (W), red (R), green (G), and blue (B) is described, but the colors of the sub-pixels are not limited to these. For example, in each pixel, a sub-pixel of another color having the same high luminosity factor as white (W) may be used instead of the white (W) sub-pixel.

Incidentally, in the present specification, "OLED" may be read as "organic EL (Electro Luminescence)." For example, the OLED display device can be said to be an organic EL display device. Further, since the video includes multiple image frames, a "video" may be read as an "image."

Incidentally, the embodiment of the present technique is not limited to the above-described embodiment, and various changes can be made within a scope not departing from the gist of the present technique.

Further, the effects described in the present specification are merely exemplary and not limitative, and there may be other effects.

It should be noted that the present technique can have the following configurations.

(1)

A signal processing device including:

a signal processing unit that performs acquiring information regarding at least one of luminance enhancement time obtained by measuring time for enhancing luminance on a display panel, a temperature rise amount of the display panel, and a feature amount of a video signal corresponding to video displayed on the display panel, when increasing luminance of the video signal from a low-luminance display signal to a high-luminance display signal, and adaptively controlling a first gain for enhancing the luminance of the video signal, according to a degree of influence on a temperature rise of the display panel, in reference to the acquired information.

(2)

The signal processing device described in the above item (1), in which the signal processing unit further acquires a measurement result of a current flowing through the display panel.

(3)

The signal processing device described in the above item (1) or (2), in which the signal processing unit achieves high luminance of the video signal by supplementarily adding the first gain to a second gain used for obtaining the high luminance.

(4)

The signal processing device described in any one of the above items (1) to (3), in which the signal processing unit uses as the first gain a value corresponding to a linked gain that is linked to information regarding at least one of the luminance enhancement time, the temperature rise amount, and the feature amount.

(5)

The signal processing device described in the above item (4), in which, when multiple linked gains are present, the signal processing unit uses a value obtained by multiplying values of the multiple linked gains together or a minimum value among the values of the multiple linked gains, as the first gain.

(6)

The signal processing device described in any one of the above items (1) to (5), in which the signal processing unit calculates an integration step value according to a level of the video signal, and integrates the calculated integration step value in a time axis direction to calculate an integrated value according to the luminance enhancement time.

(7)

The signal processing device described in the above item (6), in which the signal processing unit calculates the integrated value according to the luminance enhancement time for each predetermined area on a screen of the display panel.

(8)

The signal processing device described in any one of the above items (1) to (7), in which the signal processing unit calculates an integration step value to be used when integration is performed according to a load that increases due to high luminance, and calculates an integrated value according to the temperature rise by integrating the calculated integration step values in the time axis direction.

(9)

The signal processing device described in the above item (8), in which the signal processing unit sets a positive integration step value corresponding to a high load state to be larger than a predetermined value, and sets a negative integration step value corresponding to a low load state in which a load is lower than the high load state to be smaller than a predetermined value, in order to correlate the integration step value with the temperature rise.

(10)

The signal processing device described in the above item (8) or (9), in which the signal processing unit calculates the integrated value according to the temperature rise for each predetermined area on the screen of the display panel.

(11)

The signal processing device described in any one of the above items (8) to (10), in which the signal processing unit calculates the integrated value corresponding to the temperature rise, in view of information regarding the temperature obtained by predicting the load of the video or measurement by a temperature sensor provided on the display panel.

(12)

The signal processing device described in the above item (11), in which one or multiple temperature sensors for measuring a surface temperature are provided on the display panel.

(13)

The signal processing device described in any one of the above items (1) to (12), in which the feature amount includes an APL.

(14)

The signal processing device described in the above item (13), in which the signal processing unit measures the APL for an entire screen of the display panel or for each predetermined area on the screen.

(15)

The signal processing device described in the above item (4), in which the signal processing unit determines the linked gain that is linked to the feature amount, in view of the measurement result of the current flowing through the display panel.

(16)

A signal processing method including:

by an information processing apparatus, acquiring information regarding at least one of luminance enhancement time obtained by measuring time for enhancing luminance on a display panel, a temperature rise amount of the display panel, and a feature amount of a video signal corresponding to video displayed on the display panel, when increasing luminance of the video signal from a low-luminance display signal to a high-luminance display signal; and adaptively controlling a first gain for enhancing the luminance of the video signal, according to a degree of influence on a temperature rise of the display panel, in reference to the acquired information.

(17)

A display device including:

a signal processing unit that processes a video signal, and a panel unit having a display panel that displays video corresponding to the video signal, in which the signal processing unit performs acquiring information regarding at least one of luminance enhancement time obtained by measuring time for enhancing luminance on the display panel, a temperature rise amount of the display panel, and a feature amount of the video signal corresponding to the video displayed on the display panel when increasing luminance of the video signal from a low-luminance display signal to a high-luminance display signal, and adaptively controlling a first gain for enhancing the luminance of the video signal, according to a degree of influence on a temperature rise of the display panel, in reference to the acquired information.

(18)

The display device described in the above item (17) in which the panel unit has an OLED display panel.

REFERENCE SIGNS LIST

1: Display device
110: Signal input unit
111: Signal processing unit
112: Panel drive unit
113: Panel unit
131: Luminance enhancement time measuring section
132: Temperature rise amount measuring section
133: APL measuring section
134: Luminance enhancement gain calculating section
135: Adding section
136: Multiplying section
151: Panel temperature measuring section
152: Panel current measuring section
171: Temperature sensor

The invention claimed is:

1. A signal processing device comprising:

circuitry configured to perform:

acquiring information regarding luminance enhancement time obtained by measuring time for enhancing luminance on a display panel and a temperature rise amount of the display panel, when increasing luminance of the video signal from a low-luminance display signal to a high luminance display signal, and adaptively controlling a first gain for enhancing the luminance of the video signal, according to a degree of influence on a temperature rise of the display panel, in reference to the acquired information, wherein the circuitry is configured to calculate an integration step value according to a level of the video signal, in which the integration step value being a negative integration step value in a low-value region at input video signals below a threshold input video signal level of the video signal and a positive integration step in a high value region at input video signal values above the threshold input video signal level;

integrate the calculated integration step value in a time axis direction to calculate an integrated value according to the luminance enhancement time, and apply the calculated integrated value to assist in controlling the first gain for enhancing the luminance of the video signal.

2. The signal processing device according to claim 1, wherein the circuitry configured to achieve high luminance of the video signal by supplementarily adding the first gain to a second gain used for obtaining the high luminance.

3. The signal processing device according to claim 2, wherein the circuitry configure to use as the first gain a value corresponding to a linked gain that is linked to information regarding at least one of the luminance enhancement time, the temperature rise amount, and a feature amount of a video signal according to video displayed on the display panel in which the feature amount is also used in acquiring the information and includes a measurement result of a current flowing through the panel.

4. The signal processing device according to claim 3, wherein, when multiple linked gains are present, the circuitry configure to use a value obtained by multiplying values of the multiple linked gains together or a minimum value among values of the multiple linked gains, as the first gain.

5. The signal processing device according to claim 1, wherein the calculated integration step value is a step function having the low value region at input video signal values below the threshold input video signal value and the high value region at input video signal values above the threshold input video signal.

6. The signal processing device according to claim 5, wherein the circuitry is configured to calculate the integrated value according to the luminance enhancement time for each predetermined area on a screen of the display panel.

7. The signal processing device according to claim 1, wherein the circuitry is configured to calculate an integration step value to be used when integration is performed according to a load that increases due to high luminance, and calculate an integrated value according to the temperature rise by integrating the calculated integration step value in a time axis direction, wherein the calculated integration step value is a step function having the low value region at input video signal values below the threshold input video signal value and the high value region at input video signal values above the threshold input video signal.

8. The signal processing device according to claim 7, wherein the circuitry is configured to set the positive integration step value corresponding to a high load state to be larger than a predetermined value, and sets the negative integration step value corresponding to a low load state in which a load is lower than the high load state to be smaller than a predetermined value, in order to correlate the integration step value with the temperature rise.

9. The signal processing device according to claim 7, wherein the circuitry is configured to calculate the integrated value according to the temperature rise for each predetermined area on a screen of the display panel.

10. The signal processing device according to claim 7, wherein the circuitry is configured to calculate the integrated value according to the temperature rise, in view of information regarding a temperature obtained by predicting the load of the video or measurement by a temperature sensor provided on the display panel.

11. The signal processing device according to claim 10, wherein one or multiple temperature sensors for measuring a surface temperature are provided on the display panel.

12. The signal processing device according to claim 3, wherein the feature amount includes an APL.

13. The signal processing device according to claim 12, wherein the circuitry is configured to measure the APL for an entire screen of the display panel or for each predetermined area on the screen.

14. The signal processing device according to claim 3, wherein the circuitry is configured to determine the linked gain that is linked to the feature amount, in view of a measurement result of a current flowing through the display panel.

15. A signal processing method comprising: by a signal processing apparatus, acquiring information regarding luminance enhancement time obtained by measuring time for enhancing luminance on a display panel and a temperature rise amount of the display panel, when increasing luminance of the video signal from a low-luminance display signal to a high-luminance display signal;

adaptively controlling a first gain for enhancing the luminance of the video signal, according to a degree of influence on a temperature rise of the display panel, in reference to the acquired information;

calculating an integration step value according to a level of the video signal, the integration step value being a negative integration step value in a low-value region at input video signal values below a threshold input video signal level and a positive integration step value in a high-value region at input video signal values above the threshold input video signal level;

integrating the calculated integration step value in a time axis direction to calculate an integrated value according to the luminance enhancement time; and applying the calculated integrated value to assist in controlling the first gain for enhancing the luminance of the video signal.

16. A display device comprising:

a signal processing apparatus that processes a video signal;

a display panel that displays video corresponding to the video signal; and circuitry of the signal processing apparatus that is configured to acquire information regarding luminance enhancement time obtained by measuring time for enhancing luminance on a display panel and a temperature rise amount of the display panel, when increasing luminance of the video signal from a low-luminance display signal to a high-luminance display signal, adaptively control a first gain for enhancing the luminance of the video signal, according to a degree of influence on a temperature rise of the display panel, in reference to the acquired information, and calculate an integration step value according to a level of the video signal, the integration step value being a negative integration step value in a low-value region at input video signal values below a threshold input video signal level and a positive integration step value in a high-value region at input video signal values above the threshold input video signal level, integrate the calculated integration step value in a time axis direction to calculate an integrated value according to the luminance enhancement time, and apply the calculated integrated value to assist in controlling the first gain for enhancing the luminance of the video signal.

17. The display device according to claim 16, wherein the panel is an OLED display panel.

18. The signal processing device according to claim 1, comprising at least one temperature sensor that measures the temperature rise amount located in a central portion of a screen of the display panel.

19. The display device according to claim 17, wherein the display panel comprises sub-pixels or white, red, green, and blue.

20. The signal processing device according to claim 1, wherein the temperature rise amount is based on a detection of an increase in luminance.

* * * * *